United States Patent [19]

Green et al.

[11] 4,432,556
[45] Feb. 21, 1984

[54] PISTON SEALING ARRANGEMENT FOR A CRYOGENIC REFRIGERATOR

[75] Inventors: Geoffrey F. Green, Annapolis; James C. Humphrey, Clinton, both of Md.

[73] Assignee: The United States of America as represented by the Secretary of the Navy, Washington, D.C.

[21] Appl. No.: 500,117

[22] Filed: Jun. 1, 1983

[51] Int. Cl.³ .................... F01B 31/00; F16J 15/40; F16J 1/00
[52] U.S. Cl. ......................... 277/73; 277/3; 277/15; 92/87; 92/162 R
[58] Field of Search ............... 91/401; 92/78, 80, 82, 92/87, 162 R; 277/3, 15, 24, 73

[56] References Cited

U.S. PATENT DOCUMENTS

| | | | |
|---|---|---|---|
| 3,104,619 | 9/1963 | Swarthout | 92/87 |
| 3,216,651 | 11/1965 | King et al. | 277/73 X |
| 3,818,805 | 6/1974 | Johansson | 92/87 X |
| 3,848,877 | 11/1974 | Bengtsson et al. | 277/3 |
| 3,892,166 | 7/1975 | Johansson | 92/87 X |
| 4,093,239 | 6/1978 | Sugahara | 277/3 |
| 4,247,121 | 1/1981 | Bergman | 277/3 |
| 4,355,519 | 10/1982 | Kerchevol et al. | 277/198 X |

FOREIGN PATENT DOCUMENTS 481714 12/1975 U.S.S.R. .................... 277/3

Primary Examiner—Robert S. Ward
Attorney, Agent, or Firm—R. F. Beers; L. A. Marsh

[57] ABSTRACT

A sealing arrangement for a rectilinear reciprocable piston within a cryogenic refrigerator comprising a buffer defined by dual O-rings disposed around the circumference of the piston and containing pressurized gas of the same type as the refrigeration gas. The buffer limits or prevents both the entrance of contaminants and also the escape of the refrigeration gas.

2 Claims, 2 Drawing Figures

PISTON SEALING ARRANGEMENT FOR A CRYOGENIC REFRIGERATOR

BACKGROUND

This invention relates to refrigeration and more particularly to a sealing arrangement for a rectilinear reciprocable piston of a cryogenic refrigerator.

In many cryogenic refrigerators (i.e., the Stirling, Gifford-MacMahon, and Claude type refrigerators), a piston rectilinearly reciprocates within a cylinder to moveably define a variable volume expansion chamber. A refrigeration gas flows into and out of the variable volume expansion chamber in accordance with the movement of the piston and is cooled by controlled cycling with suitable heat exchange.

A problem associated with these refrigerators is ineffective sealing between the rectilinear reciprocable piston and the cylinder within which it moves. When the sealing is ineffective, the refrigeration gas from the expansion chamber escapes along the piston thus decreasing the efficiency of the refrigerator.

Additionally, ineffective sealing permits the entrance of contaminants (i.e., atmospheric gases such as oxygen, nitrogen, and hydrogen). The problem of contamination becomes especially acute when these refrigerators are employed to cool helium to a liquified state. Helium has an extremly low boiling point remaining in a gaseous state long after most gases have liquified. Therefore, any entering contaminating gas would liquify and seep to the expansion chamber which would further decrease the efficiency of the refrigerator.

SUMMARY OF THE INVENTION

The present invention throttles both the escape of the refrigeration gas from the expansion chamber and the entrance of contaminants therein by providing a buffer which reciprocates with the piston. The buffer is defined between dual O-rings around the circumference of the piston and contains a gas of the same type as the refrigeration gas.

OBJECTS OF THE INVENTION

An object of the instant invention is to provide a simple, effective, and inexpensive piston sealing arrangement.

A more particular object is to provide a sealing arrangement which more adequately protects against the entrance of contaminating gases when the refrigerator is employed to liquify helium.

These and other objects of the invention will be apparent upon reference to the accompanying detailed description when taken in conjunction with the following drawings:

DETAILED DESCRIPTION OF THE INVENTION

Figure 1:
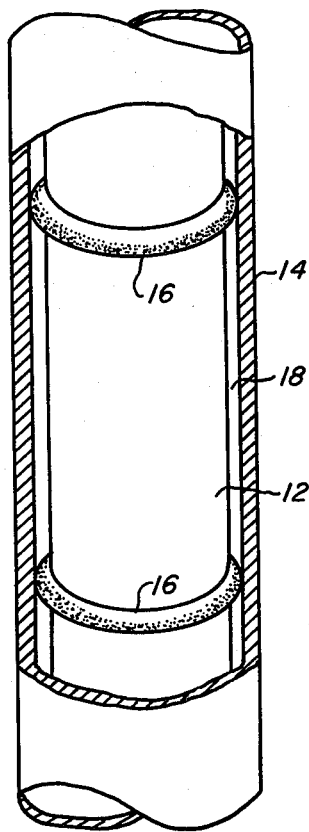
FIG. 1 is a perspective view of the dual O-ring with the cylinder broken away.

As illustrated in FIG. 1, a cryogenic refrigerator includes a piston 12 which reciprocates within a cylinder 14. Two commercially available O-rings 16 are disposed around the circumference of the piston 12 to define a buffer 18 therebetween. The O-rings 16 are seated partways within circumferential grooves in the piston 12 (not shown) and are spaced a fixed distance apart. The cross section of the O-rings 16 are such that a gas tight fit is formed with the inner wall of the cylinder 14. The O-rings 16 should also be of suitable material to resist both wear and deterioration.

Figure 2:
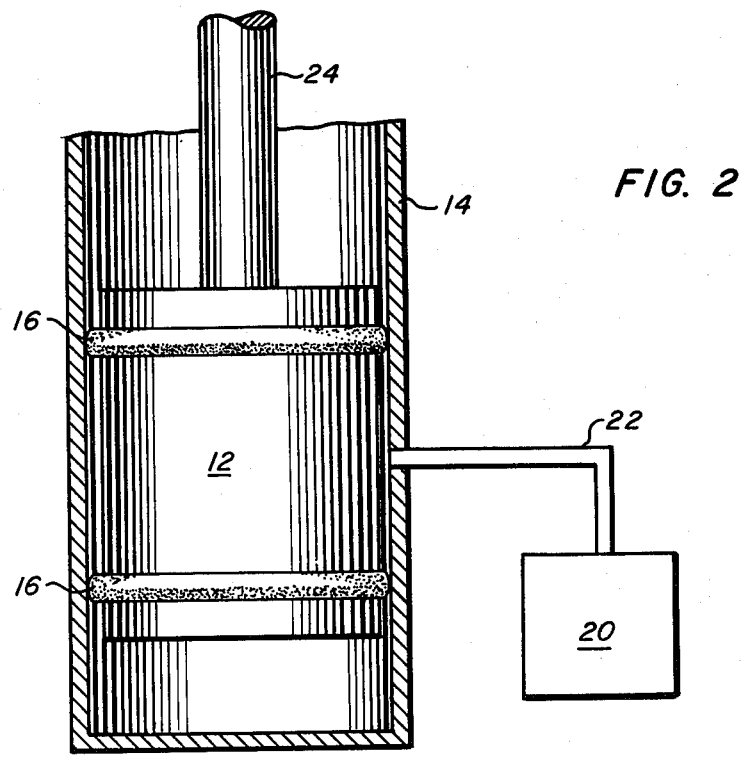
FIG. 2 is a cross sectional view of a typical rectilinear reciprocating piston employing the invention.

As illustrated in the cross sectional view of FIG. 2, a commercially available surge tank 20 communicates with the buffer 18 via a gas supply conduit 22. A gas tight fit connects the gas supply conduit 22 to the cylinder 14 midway between the upper and lower most point of the piston's travel. In order that the O-rings 16 do not travel beyond the connection of the gas supply conduit 22, the distance between the O-rings 16 must not be less than the length of the piston's stroke.

In operation, the piston rod 24 causes the piston 12 to reciprocate within the cylinder 14 to define a variable volume expansion chamber (not shown),. Pressurized gas of the same type as that which is cooled is released into the buffer 18 from the surge tank 20 via the gas supply conduit 22. The gas is contained within the buffer 18 and reciprocates within the piston 12 acting as a moveable barrier that both limits or prevents the entrance of contaminants and the escape of the refrigeration gas.

Although the invention has been illustrated and described with the particular embodiments illustrated, it will be apparent to those skilled in the art that various changes may be made therein without departing from the spirit of the invention as set forth in the appended claims.

What is claimed is:

1. A piston sealing arrangement for a cryogenic refrigerator of the type having a piston slidably and concentrically disposed within a cylinder to moveably define a variable volume expansion chamber for cooling a refrigeration gas comprising:
   dual O-rings disposed around the circumference of the piston to define a buffer therebetween; and
   means for supplying to the buffer a pressurized gas of the same type as the refrigeration gas.

2. The arrangement as claimed in claim 1, wherein the means for supplying the pressurized gas comprises a surge tank and a gas supply conduit, said gas supply conduit connecting said surge tank to the buffer.

* * * * *